(12) United States Patent
Bhattiprolu et al.

(10) Patent No.: US 12,002,118 B2
(45) Date of Patent: Jun. 4, 2024

(54) DISTRIBUTED LEDGER IN OIL AND GAS CUSTODY TRANSFERS

(71) Applicant: Schneider Electric Systems USA, Inc., Foxborough, MA (US)

(72) Inventors: Subha Lalitha Bhattiprolu, Hyderabad (IN); Richard Linwood Linscott, Plainville, MA (US); Alexander Park Johnson, Houston, TX (US)

(73) Assignee: Schneider Electric Systems USA, Inc., Foxborough, MA (US)

( * ) Notice: Subject to any disclaimer, the term of this patent is extended or adjusted under 35 U.S.C. 154(b) by 383 days.

(21) Appl. No.: 17/106,714

(22) Filed: Nov. 30, 2020

(65) Prior Publication Data

US 2022/0172221 A1 Jun. 2, 2022

(51) Int. Cl.
*G06Q 50/06* (2024.01)
(52) U.S. Cl.
CPC ......... *G06Q 50/06* (2013.01); *G06Q 2220/10* (2013.01)
(58) Field of Classification Search
CPC .. G06Q 30/018; G06Q 50/06; G06Q 2220/10; H04L 9/3247
USPC ......................................................... 705/50
See application file for complete search history.

(56) References Cited

U.S. PATENT DOCUMENTS

| 10,601,829 | B1* | 3/2020 | Nelson | G06F 16/954 |
|---|---|---|---|---|
| 2018/0232819 | A1* | 8/2018 | Stöcker | G01D 4/004 |
| 2020/0019931 | A1 | 1/2020 | Prahbhaker et al. | |
| 2020/0051184 | A1* | 2/2020 | Barbour | E21B 41/00 |
| 2020/0064783 | A1* | 2/2020 | Tran | F24F 11/72 |
| 2020/0064815 | A1* | 2/2020 | Tran | G05B 19/4155 |
| 2020/0080873 | A1* | 3/2020 | Jackson | G06F 16/2255 |
| 2020/0084026 | A1* | 3/2020 | Reading | H04L 9/3239 |
| 2020/0225649 | A1* | 7/2020 | Cahill | H04L 67/12 |

(Continued)

FOREIGN PATENT DOCUMENTS

| GB | 2582421 A | 9/2020 |
|---|---|---|
| WO | 2019222309 A | 11/2019 |

OTHER PUBLICATIONS

European EP Extended Search Report for EP Application No. 21210591.0 dated Apr. 25, 2022.

(Continued)

*Primary Examiner* — Courtney P Jones
(74) *Attorney, Agent, or Firm* — Locke Lord LLP (57) ABSTRACT

Systems and methods for conducting hydrocarbon custody transfer uses blockchain to eliminate or minimize mistrust over the reliability, accuracy, and immutability of data. The blockchain is provided as a shared data layer that can store the data in a secure and tamperproof manner. The data may include data generated by equipment, sensors, people, processes, and the like, and may be automatically generated or compiled manually. A blockchain application digitally signs the data using public/private key encryption before uploading the data to the blockchain. The data can then be made available to all authorized custody transfer parties, including oil producers, well operators, regulatory teams, and the like, in the form of notifications, shared dashboards, and/or auto reports. Smart contracts may be embedded in the blockchain to carry out monetary settlements and value exchange by automating funds transfer if certain criteria are met.

18 Claims, 6 Drawing Sheets

(56) References Cited

U.S. PATENT DOCUMENTS

| | | |
|---|---|---|
| 2020/0228342 A1* | 7/2020 | Nixon .................... H04L 9/3236 |
| 2020/0232194 A1* | 7/2020 | Periaswamy ............. G01F 1/32 |
| 2020/0380512 A1* | 12/2020 | Witkowski ............. G06Q 50/06 |
| 2021/0058235 A1* | 2/2021 | Rangarajan ........... H04L 9/3239 |
| 2021/0165400 A1* | 6/2021 | Cahill ................ G05B 19/4185 |
| 2022/0278853 A1* | 9/2022 | Ben-Reuven ......... H04L 63/123 |
| 2023/0224161 A1* | 7/2023 | Shang ....................... H04L 9/50 |
| | | 713/150 |

OTHER PUBLICATIONS

Guildone, "New Standards of Measurement: A Distributed Ledger for Hydrocarbon Volume Measurement and Real-Time Value Exchange", dated Aug. 1, 2018, retrieved from http://guild1.co/wp-content/uploads/2018/09/G1-Hydrocarbon-Measurement-Ledger-final-for-Houston.pdf.

* cited by examiner

DISTRIBUTED LEDGER IN OIL AND GAS CUSTODY TRANSFERS

TECHNICAL FIELD

The present disclosure relates to oil and gas custody transfers and more particularly to methods and systems of using distributed ledgers for conducting transfers of custody in the oil and gas industry and other types of custody transfers in other industries.

BACKGROUND

Oil and gas wells are used to extract hydrocarbons from a subterranean formation. A typical well site includes a wellbore that has been drilled into the formation and sections of pipe or casing cemented in place within the wellbore to stabilize and protect the wellbore. The casing is perforated at a certain target depth in the wellbore to allow the hydrocarbons to flow from the formation into the casing. Tubing is run down the casing to provide a conduit for the hydrocarbons to flow up to the surface where they are collected in holding tanks. From the holding tanks, the hydrocarbons may be pumped as oil or gas or a mixture of both via pipelines or otherwise transported to remote locations for further processing.

Throughout the above process, numerous sensors and instruments are used to measure and acquire data on certain parameters pertaining to the hydrocarbons brought to the surface, including flow rate, temperature, pressure, density, viscosity, and the like. Similar sensors and instruments are used to measure and acquire data on the hydrocarbons transported from the holding tanks to the remote locations. This data then governs or becomes the basis for a commercial exchange called a "custody transfer" that takes place related to the hydrocarbons.

Custody transfers are well known in the oil and gas industry and generally refer to transactions that effect (and affect) transfer of the hydrocarbons from one party to another. As may be expected, disputes often arise between transaction parties over the reliability and accuracy of the data involved in the custody transfer process. Such disputes can result in misinterpretation of contracts, issues with quantity and quality of the hydrocarbons to be transferred, and the like. In short, a lot of money/value is at stake for there to be lingering doubt over the reliability and accuracy of the data.

Thus, while a number of advances have been made in the oil and gas industry, it will be readily appreciated that improvements are continually needed.

SUMMARY

The present disclosure relates to systems and methods for using distributed ledger technology, such as blockchain, directed acyclic graph (DAG), and the like, to eliminate or minimize mistrust over the reliability, accuracy, and immutability of data in oil and gas custody transfers and other types of custody transfers. The distributed ledger may be provided as a shared data layer that can securely and immutability accumulate and store data involved in a custody transfer. Such data may include data generated by equipment, sensors, people, processes, and the like, and may be automatically generated or compiled manually. A distributed ledger sender/publisher application or app digitally signs the data before uploading the data to the blockchain. This distributed ledger sender/publisher application may be implemented using hardware, software, or a combination of both, and may be installed and executed on each device that generates data relied upon in the custody transfer. The data can then be made available to all authorized custody transfer parties, including oil producers, well operators, regulatory teams, and the like, in the form of notifications, shared dashboards, and/or auto reports. The data can also be used for data analysis, archival purposes, decision making, inspections, audits, and any other suitable uses of the data. In some embodiments, smart contracts may be embedded in the blockchain to carry out monetary settlements and value exchange by automating funds transfer only if certain criteria are strictly met, as reflected by the data.

In general, in one aspect, the present disclosure relates to a system for tamper-proof publishing of hydrocarbon data in oil and gas custody transfers. The system comprises, among other things, a controller, and a storage device coupled to the processor and storing computer-readable instructions for a distributed ledger app thereon. The distributed ledger app, when executed by the controller, causes the system to obtain a hash value for the hydrocarbon data, the hash value produced using a predefined hash function and apply a digital signature to the hydrocarbon data and the hash value. The distributed ledger app, when executed by the controller, causes the system to connect to a distributed ledger designated to receive the hydrocarbon data, and transmit the hydrocarbon data and hash value to the distributed ledger over a private or public network, including the Internet.

In general, in another aspect, the present disclosure relates to a method of tamper-proof publishing of hydrocarbon data in oil and gas custody transfers. The method comprises, among other things, obtaining, using a controller, a hash value for the hydrocarbon data, the hash value produced using a predefined hash function, and applying, using the controller, a digital signature to the hydrocarbon data and the hash value. The method further comprises connecting, using the controller, to a distributed ledger designated to receive the hydrocarbon data, and transmitting, using the controller, the hydrocarbon data and hash value to the distributed ledger over a private or public network, including the Internet.

In general, in yet another aspect, the present disclosure relates a non-transitory computer-readable medium containing program logic that, when executed by operation of one or more computer processors, performs a method of managing hydrocarbon data in oil and gas custody transfers according to any one or more of the foregoing embodiments.

In accordance with any one or more of the foregoing embodiments, the digital signature is applied by encrypting the hydrocarbon data and the hash value using a private key of a public/private key pair uniquely associated with the system. In accordance with any one or more of the foregoing embodiments, cryptographic hardware is coupled to the controller, the cryptographic hardware operable to generate the hash value for the hydrocarbon data.

In accordance with any one or more of the foregoing embodiments, a hash value is obtained of calibration data and device configuration parameters for devices used to acquire the hydrocarbon data, a digital signature is applied to the calibration data, the device configuration parameters, and the hash value, and the calibration data, device configuration parameters, and hash value is transmitted to the distributed ledger.

In accordance with any one or more of the foregoing embodiments, the distributed ledger is a private ledger configured to require provision of access credentials and the distributed ledger app causes the system to provide the access credentials. In accordance with any one or more of the foregoing embodiments, the distributed ledger stores one or more smart contracts thereon and the hydrocarbon data transmitted by the system causes at least one of the smart contracts to self-execute.

In accordance with any one or more of the foregoing embodiments, the hydrocarbon data is obtained automatically or manually using one or more of: a flow monitoring and control system, a field device manager (FDM), a metering skid, metering equipment, proving equipment, an edge node, calibration equipment, quality analysis equipment, and field personnel.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

In the figures, identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

It is noted that, as used in this specification and the appended claims, the singular forms "a," "an," and "the," and any singular use of any word, include plural references unless expressly and unequivocally limited to one reference. As used herein, the term "includes" and its grammatical variants are intended to be non-limiting, such that recitation of items in a list is not to the exclusion of other like items that can be substituted or added to the listed items.

As mentioned earlier, disputes often arise in oil and gas custody transfers due to mistrust or misunderstanding over the reliability and accuracy of the data involved in the custody transfers. Parties to a custody transfer are often preconditioned to trust their own data due to prior experience with poorly-calibrated equipment or with dishonest and unscrupulous parties. As a result, parties often employ their own duplicate equipment and obtain their own duplicate readings at the point of the custody transfer, which makes it cumbersome and difficult for regulatory agencies to audit and reconcile multiple data sources from multiple parties. These factors and similar factors resulting from misinterpretation or lack of trust in the data can affect the value exchange or money settlements, and also provoke other disputes downstream. Hence, it is important to remove concerns regarding trust over the data and to bring in more transparency in the custody transfer process. This means the data needs to be made immutable, tamper proof, and easily authenticated, with access to the data restricted to prevent unauthorized viewing. In short, the data needs to become more trustworthy.

Embodiments of the present disclosure provide systems and methods for making the data involved in custody transfers and similar business processes more trustworthy. These systems and methods use blockchain, DAG, and similar distributed ledger technology to make the data immutable, tamper proof, and easily authenticated, with access to the data restricted to prevent unauthorized viewing. Distributed ledger technology is well-known in the art and generally refers to the use of independent computers or "nodes" that each store an identical copy of the data, including all prior versions thereof, instead of a single copy of the data being stored at a centralized location. In blockchain, for example, data is stored as "blocks" in an append-only manner such that existing blocks are never deleted or overwritten and new blocks are simply appended to the end of existing blocks, thus creating a chain of blocks. A distributed ledger can address many of the issues that arise in custody transfers and other business processes because, among other things, the distributed ledger renders the data immutable and tamper proof. Any actor wishing to alter the data must make the same alteration on a majority of the independent nodes in order to be successful, a feat that would be extremely difficult.

Figure 1:
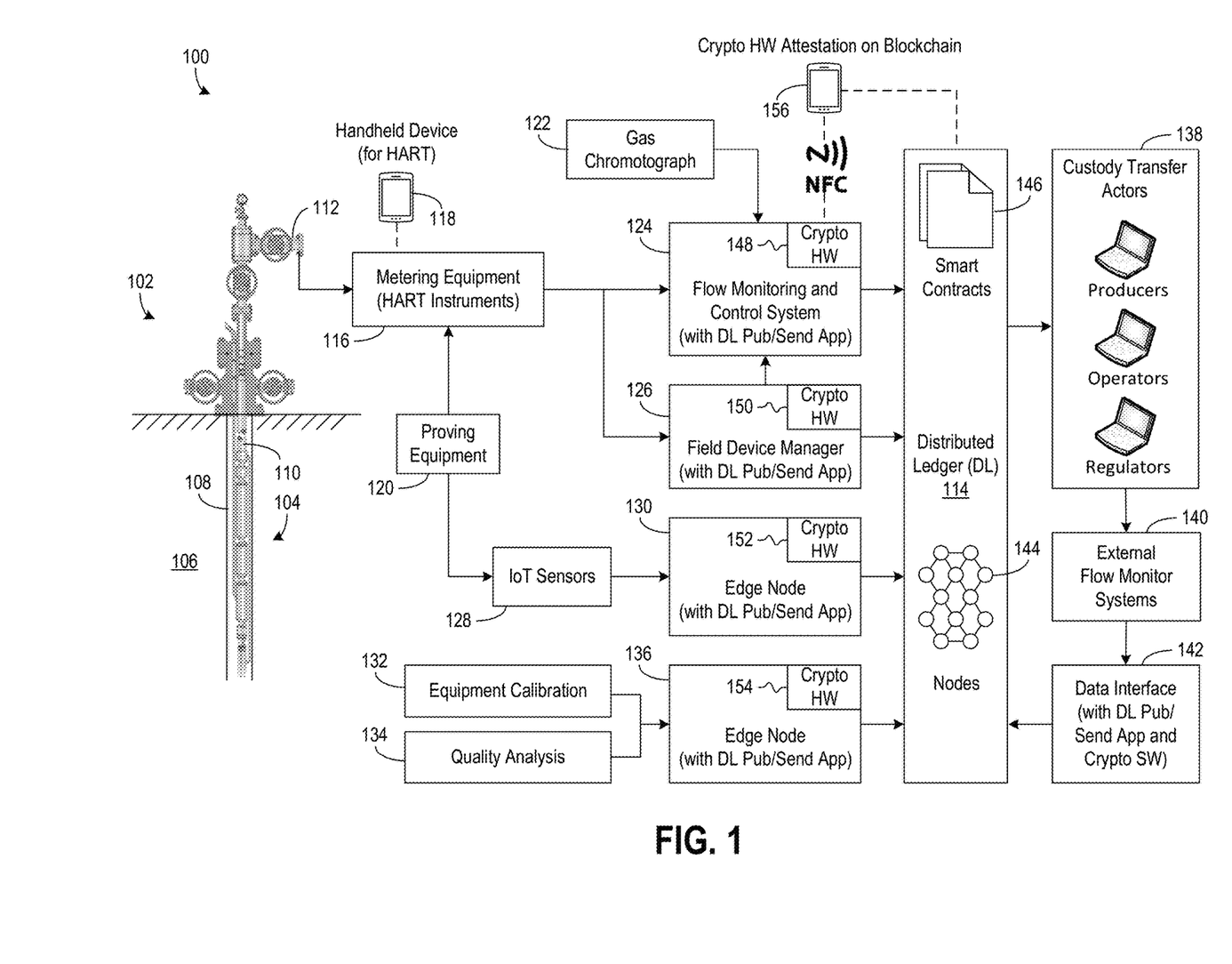
FIG. 1 is a schematic diagram of an exemplary blockchain-based custody transfer system according to embodiments of the present disclosure.

Referring now to FIG. 1, a schematic diagram of an exemplary custody transfer system 100 is shown according to embodiments of the present disclosure. In this example, the custody transfer system 100 is being used to effect custody transfer of hydrocarbons produced at a wellhead 102 installed over a wellbore 104 that has been drilled into a subterranean formation 106. Casing 108 has been cemented into the wellbore 104 and tubing 110 extended down through the casing 108 to take in and bring up hydrocarbons from the formation 106. A discharge line 112 carries the produced hydrocarbons from the wellhead 102 to one or more holding tanks (not expressly shown) for storage and processing at the surface. Although the custody transfer system 100 is depicted with respect to an onshore well, those skilled in the art will understand that the system 100 can also be used with custody transfers for an offshore well, a refinery, and the like, for liquid and gaseous transfers alike.

Further, although the custody transfer system 100 is described in the context of the oil and gas industry, it will be appreciated that the principles and teachings herein may also be applied to other industries and types of custody transfers within the scope of the present disclosures.

As FIG. 1 shows, data related to the hydrocarbons in the custody transfer, whether generated by measuring equipment, control processes, monitoring applications, or field personnel, or stored in one or more databases for such data, is accumulated and stored on a distributed ledger 114 set up or designated to receive the hydrocarbon data. The distributed ledger 114 may take the form of a blockchain, DAG, or other immutable, trustworthy, and decentralized data store. In the example, metering equipment 116 is positioned at or near the discharge line 112 to measure a flow rate, density, temperature, pressure, viscosity, and other relevant parameters of the hydrocarbons from the wellbore 104. Examples of metering equipment 116 that may be used include Coriolis flowmeters, ultrasonic flow meters, vortex flowmeters, thermal flowmeters, differential pressure flowmeters, positive displacement flowmeters, turbine flowmeters, and the like. Such metering equipment 116 may be wired or wireless devices capable of communicating over HART (Highway Addressable Remote Transducer), which is a hybrid analog and digital industrial automation communication protocol, as well as other Fieldbus protocols (e.g., Foundation Fieldbus, Profibus, etc.) and devices. Where applicable, a handheld or other mobile device 118 (e.g., tablet, smart phone, etc.) may be used to configure and operate such HART capable metering equipment 116.

In some embodiments, the metering equipment 116 may be part of a metering skid, which is an assemblage of various hydrocarbon flow measuring instruments mounted on a movable frame at the wellhead 102. Metering skids, also called custody transfer skids, typically include several types of metering equipment 116, proving equipment 120, and one or more gas chromatographs 122 for analyzing and metering gaseous hydrocarbons. Alternatively, Lease Automatic Custody Transfer (LACT) units may be used to measure the volume and quality of hydrocarbons for custody transfer in midstream oil and gas operations. Other types of measurement devices and sensors known to those skilled in the art may also be used, such as temperature, pressure, viscosity, and similar measurements devices. The data from these devices, including flow calculations, quality analysis, proving results, error rates, configuration changes, audit reports, and other data known to those skilled in the art, are provided to a flow monitoring and control system 118.

The flow monitoring and control system 124, as the name suggests, performs monitoring and control functionality for the equipment and measurement devices at the wellhead 102. For example, periodic proving results from live flow meters (i.e., while metering is in progress) or other metering equipment 114 can be pushed to the flow monitoring and control system 124 for comparison to the output of a master proving meter. The flow monitoring and control system 124 can calculate the error between the metering equipment values and the master proving meter values and apply an appropriate correction factor. In some setups, the flow monitoring and control system 124 can also produce some of the same or similar data as the metering equipment 114. The flow monitoring and control system 124 is typically implemented using programmable logic controllers (PLCs), remote terminal units (RTU), programmable automation controllers (PAC), and the like. As an example, the flow monitoring and control system 124 may be a SCADAPack® smart RTU from Schneider Electric USA, Inc., running Realflo® software also available from Schneider Electric USA. The Realflo® software allows the SCADAPack® smart RTU to operate as a gas flow computer (GFC) while retaining the basic programming of the RTU. This result in a versatile gas flow computer that is well suited to any application requiring gas flow measurement.

In addition to the flow monitoring and control system 124, one or more field device managers (FDM) 126 can be used in some embodiments to monitor and publish/send enhanced data to the distributed ledger 114. An FDM 126 operates to manage and maintain certain HART capable metering equipment 116 and send, for example, equipment diagnostics and configuration changes to the distributed ledger 114. For example, the FDM 126 can receive notifications regarding HART flow meter alerts and configuration changes and can send equivalent text strings (i.e., diagnostic messages) for the alerts to the distributed ledger 114. Also, upon receiving configuration change notifications, the FDM 126 can compare the changed configuration to the last saved configuration (e.g., from a database), identify the exact parameters that were changed, and send this information along with the notification to distributed ledger 114. This allows the distributed ledger 114 to keep track of all configuration changes made to the metering equipment 116 that would affect flow computations. Note that even if the configuration changes were made by a secondary master (e.g., a hand-held device), the primary master (e.g., the SCADAPack-based flow computer 124) would get the notification.

In some embodiments, one or more sensors 128 are placed at the wellhead 102 to capture and provide any additional relevant data to the distributed ledger 114. For example, the one or more sensors 128 may include one or more measurement devices placed at the proving equipment 120 to capture proving results. Further examples of the one or more sensors 128 may include flow sensors, temperature sensors, pressure sensors, humidity sensors, proximity sensors, and the like. In some embodiments, the one or more sensors 128 are Foxboro pneumatic instruments available from Schneider Electric USA, Inc. These devices provide precise, easy to maintain measurement, control and recording of flow, temperature, pressure and liquid level. The sensors 128 may be interconnected with one another over a device network sometimes called the Internet of Things (IoT). The IoT network may be formed as a low-power WAN using a suitable low-power wireless communication protocol, such as Bluetooth Low Energy (BLE) and long range wide-area network (LoRaWAN). An edge node 130 provides a network access point that allows data from the IoT sensors 128 to be uploaded to the distributed ledger 114.

In some embodiments, analysts and other technical personnel periodically perform calibration on metering equipment and various measurement devices as part of a standard operating procedure (SOP). Data derived from such equipment calibration, indicated at 132, can be captured and published to the distributed ledger 114. This calibration data 132 can be used as evidence of regulatory compliance and also compared and validated against laboratory results for equipment proving purposes. Similarly, analysts and other technical personnel may perform quality testing and analysis of the hydrocarbons, such as basic sediment and water (BS&W) analysis. Data derived from such quality analyses, indicated at 134, is also collected and uploaded to the distributed ledger 114 in some embodiments. The equipment calibration data 132 and/or the quality analysis data 134 may be obtained offline and subsequently uploaded to the distributed ledger 114, either manually as part of an automated process, or both. An edge node 136 provides a network access point that allows the analysts and other personnel to publish the data 132 and 134 to the distributed ledger 114.

As well, the parties to an oil and gas custody transfer, including producers, operators, and regulators, indicated at 138, may bring their own data generated by their own metering equipment to the custody transfer. For example, one or more parties who are taking custody of the hydrocarbons may use their own flow monitor system 140, such as the FloBoss® flow monitoring system available from Emerson Process Management. In such cases, it could be important to bring the data generated by these external systems and applications 140 into the distributed ledger 114 for all custody transfer parties to access (e.g., view, download, etc.). To this end, a distributed ledger data interface 142 may be provided for use with the external systems and applications 140 that can import and send the data to the distributed ledger 114. The data interface 142 may be a standalone software application, or it may be an add-on for other systems and applications. This data interface 142 can either receive the data automatically through a software connection that programmatically imports data (e.g., via Modbus protocols, etc.) or through a manual data entry process.

The distributed ledger 114 itself may take several forms. For example, the distributed ledger 114 may be a public ledger in which any computer may participate as a node 144, each node 144 storing the same data as every other node and retaining the same data history as every other node. Access to the public ledger is generally available to members of the public using the appropriate protocols and software. Preferably, for oil and gas custody transfers and similar business processes, the distributed ledger 114 is a private ledger in which the nodes 144 are hosted by a private company or enterprise via an on-premises network and only authorized personnel are allowed to access the ledger, or the ledger 114 may be hosted in a public cloud service like Azure, AWS, and Google Cloud that provide access only to authorized personnel. A number of distributed ledger platforms are available for setting up a private ledger, including the Ethereum platform, the enterprise-grade Hyperledger Fabric platform, the IOTA platform designed for the Internet of Things (IoT) ecosystem, and the like. The distributed ledger 114 may also be a consortium ledger in which several companies jointly host the ledger and access is only available to personnel authorized by the companies.

Where a blockchain is used, the nodes 144 in the blockchain distributed ledger 114 store the data in blocks that are appended to the end of the chain, resulting in a progressively longer chain as blocks are added to the chain. Each block typically contains the data being stored, a timestamp for the data, and a hash value representing the immediately preceding block. The immediately preceding block, in turn, contains a hash value for the previously preceding block, and so on back through the chain. The hash value makes it simple to detect any alterations that were made to any of the previous blocks (and the content thereof). It is also possible to simply upload a hash value reflecting the data to the ledger 114 rather than the actual (raw) data itself, for example, where the amount of data is voluminous. As well, the data may be digitally signed before uploading the data to the ledger 114 using a suitable digital signature that authenticates or verifies the identity of the data originator. For example, a private key of the originator may be used to sign the data and a public key of the originator can be used to verify the signature and the authenticity of the data.

In some embodiments, the nodes 144 in the distributed ledger may be provided with one or more smart contracts 140 that execute certain actions or transactions based on the data uploaded to the ledger 114. A smart contract 140 is essentially a self-executing algorithm that automatically runs when certain pre-agreed terms and conditions are satisfied based on the data. Smart contracts 140, like the data on the ledger 114, are stored on every node 144 in the ledger and therefore immutable and tamperproof. The smart contracts 140 can be used to perform numerous actions based on the data. For example, the smart contracts 140 can notify appropriate personnel when any alerts or deviations in the custody transfer process occur (e.g., meter factor errors, flow meter alarms, equipment malfunctions, equipment calibration due dates, etc.). The smart contracts 140 can also be used to access data from the ledger 114 for purposes of building shared dash boards and reports that are accessible to multiple parties. Furthermore, smart contracts 140 can be set to automatically conduct funds transfer from a receiver to a producer if (and only if) certain conditions are satisfied, such as the hydrocarbon quality meeting or exceeding a certain error deviation percentage, and the like. The funds transfer may be accomplished using digital currency in some embodiments, such as Bitcoin and other crypto currency known to those skilled in the art.

In accordance with embodiments of the present disclosure, each device or system that acquires or captures custody transfer data is configured with a distributed ledger publisher/sender app that allows the device or system to upload the data to the distributed ledger 114. In particular, a publisher/sender app is provided on the flow monitoring and control system 124, the one or more FDMs 126, the edge node 130 that receives data from the IoT sensors 128, the edge node 136 that receives equipment calibration data 132 and quality analysis data 134, and the third-party data interface 142. The publisher/sender app operates to encrypt custody transfer data from each device or system and upload the encrypted data to the distributed ledger 114. This may be done either in real time as the data is acquired or captured by the device or system, or on a scheduled basis, such as once per day, and the like. The publisher/sender app may also allow an operator to manually initiate encryption and upload of the data through an appropriate user interface. To this end, it is contemplated that each device and system that acquires or captures custody transfer data comes equipped with sufficient processing capacity to run the publisher/sender app thereon. For example, the edge nodes 130 and 136 may be implemented using a Raspberry Pi device or other programmable device, or a bare-metal node, that can run the publisher/sender app.

In some embodiments, the actual process of encryption is performed by integrated cryptographic hardware in each device or system and the distributed ledger publisher/sender app simply accesses this hardware to encrypt the data. For example, the flow monitoring and control system 124 may be equipped with cryptographic hardware 148, the one or more FDMs 126 may be equipped with cryptographic hardware 150, the edge node 130 may be equipped with cryptographic hardware 152, and the edge node 136 may be equipped with cryptographic hardware 154. In some embodiments, the cryptographic hardware and software use public/private key encryption, also known as asymmetric encryption, to encrypt the data before the data is published/sent to the ledger 114. The cryptographic hardware may be in the form of an integrated cryptographic chipset in some embodiments that securely stores the private key along with the public key within the chipset. An example of suitable cryptographic hardware that may be used for the purposes herein is available from Riddle & Code GmbH. Of course, while separate cryptographic hardware is preferred for security reasons (and also to ease the processing burden on the device or system), cryptographic software may be also used where appropriate, such as on the third-party data interface 142. Similarly, other encryption schemes, such as symmetric encryption schemes, may be employed to encrypt data within the scope of the present disclosure.

Where public/private key encryption is used, a cryptographic hardware attestation app may be provided in some embodiments to obtain the public key from the cryptographic hardware and attest to these public keys on the ledger 114. The cryptographic hardware attestation app in some embodiments may resemble the Web Authentication API recommendation by the World Wide Web Consortium (W3C) for enabling creation and use of strong, attested, scoped, public key-based credentials by web applications. This cryptographic hardware attestation app may then be installed on a handheld or mobile device 156 that can communicate with the cryptographic hardware, for example, using Near-Field Communication (NFC) or similar wireless protocols. The mobile device 156 can then be used by custody transfer actors 138 to scan the cryptographic hardware in their devices or systems and obtain the metadata (e.g., device ID, model number, serial number, etc.) and public key therefor, then publish this information to the ledger 114. The public keys may then be stored in a public key repository on the ledger 114 for use by the custody transfer actors 138 to authenticate the originator of any encrypted (i.e., digitally signed) data published to the ledger 114.

Figure 2:
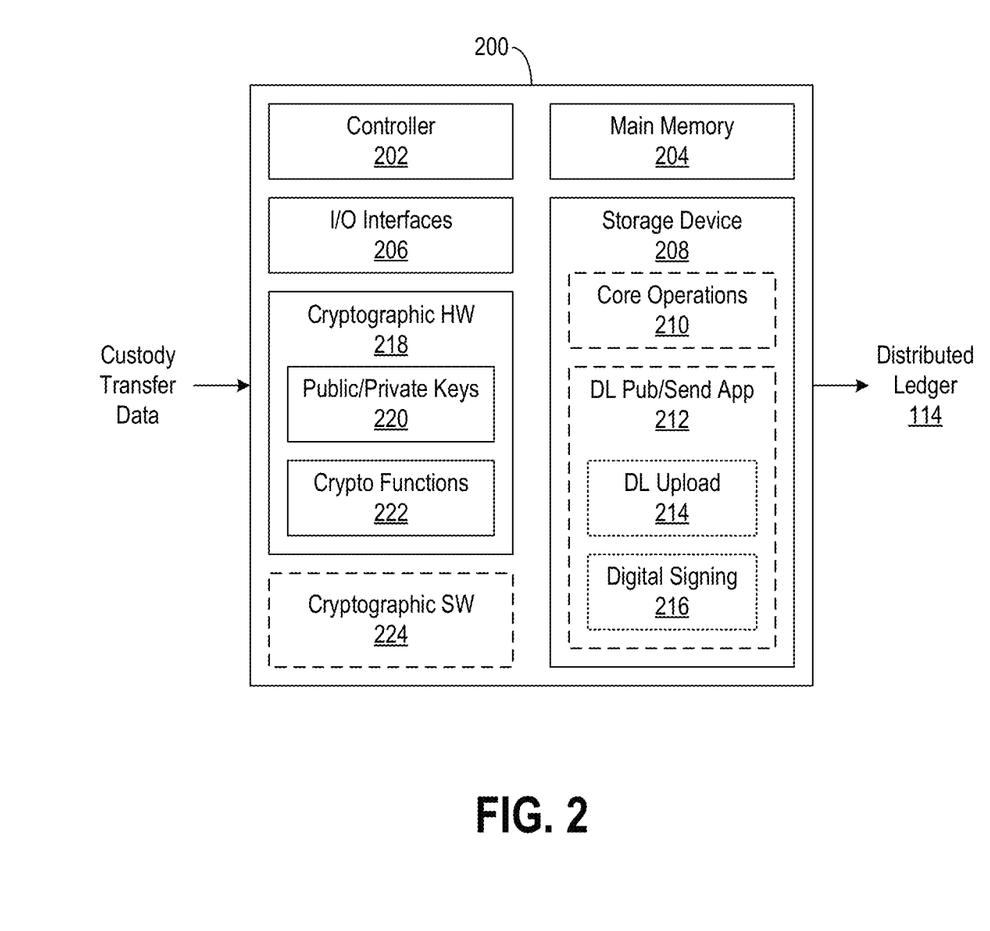
FIG. 2 is a functional diagram of an exemplary computing system that can implement blockchain-based custody transfers according to the present disclosure.

FIG. 2 illustrates an exemplary computing system 200 that may be used to implement any of the devices or systems (or a portion thereof) from FIG. 1 that acquire or capture custody transfer data for upload to the distributed ledger 114. The exemplary computing system 200 has a typical system architecture that includes a controller 202 or other processing unit that can execute computer-readable instructions. The controller 202 is communicatively coupled to a random-access memory (RAM) 204 or other dynamic storage device and one or more input/output interfaces 206 that allow the controller 202 to communicate with external devices, equipment, instruments, networks, and the like. A computer-readable storage device 208, such as a nonvolatile memory (e.g., Flash drive), magnetic disk, and other storage devices, is communicatively coupled to and stores programs and data for the controller 202. These computing components 202-208 operate in a manner generally well known in the art and thus a detailed description is omitted here for economy.

Among the programs and computer-readable instructions residing on the storage device 208 are computer-readable instructions for various core operations 210 normally performed by a given system or device and a distributed ledger publisher/sender app 212. In the example shown, the publisher/sender app 212 has or is composed of a number of functions or modules that are depicted as discrete units, including a distributed ledger upload module 214 and a digital signing module 216. Those having ordinary skill in the art will of course understand that any one of the units may be divided into several constituent units and that two or more of the units may be combined into a single unit as needed without departing from the scope of the disclosed embodiments.

In general, the distributed ledger upload module 214 is responsible for connecting the computing system 200 to the distributed ledger 114, specifically to one of the nodes 144 in the ledger. The upload module 214 provides any information needed to access the ledger 114, including access credentials (e.g., username, password, etc.) if the ledger 114 is a private ledger. Once connected, the upload module 214 also operates to upload the data acquired or captured by the computing system 200 to one of the nodes 144 in the ledger 114. This may be done automatically on a real-time basis as soon as the data is acquired, or on a scheduled basis, as mentioned earlier. The upload module 214 further operates to allow a user to manually initiate uploading of data acquired or captured by the computing system 200 to the blockchain as needed.

The digital signing module 216 is responsible for digitally signing the data before the data is uploaded to the ledger 114. Where public/private key encryption is used, the digital signing is done by encrypting the data using the private key of the computing system 200. This allows other custody transfer actors to authenticate the originator of the data using the public key of the computing system 200 (which was provided and attested by the cryptographic hardware attestation app on the mobile device 156). As mentioned earlier, the actual encryption process is performed by separate cryptographic hardware and the digital signing module 216 can simply access the cryptographic hardware and provide the data to be encrypted.

In the FIG. 2 example, a separate cryptographic hardware 218 is installed in the computing system 200. In some embodiments, the cryptographic hardware 218 may be an integrated cryptographic chipset that securely stores a private key along with a public key. The two keys form a public/private key pair 220 for the computing system 200 that may be used to encrypt and decrypt data. The public and private keys 220 are basically two strings of hexadecimal numbers that are uniquely related to one another mathematically, as understood by those skilled in the art. The unique mathematical relationship between the keys allows data encrypted using one key only to be decrypted using the corresponding key, and vice versa. The digital signing module 216 can thus apply a digital signature to the data by encrypting the data using the private key. Since only the corresponding public key can decrypt the data, a successful decryption necessarily authenticates the originator of the data (assuming the private key remains secured and has not been stolen or shared with another).

In addition to the public and private keys 220, the cryptographic hardware 218 may also include one or more cryptographic functions 222 that can encrypt data using the public or private key. Examples of cryptographic functions 222 that may be used include elliptic-curve cryptography (ECC) and other cryptographic functions known to those skilled in the art. In some embodiments, one or more hash functions may be included with the cryptographic functions 222. Each hash function can convert data of arbitrary size to fixed size values called a hash value or code. The hash value or code may then be encrypted (i.e., digitally signed) along with the data and uploaded to the blockchain. A custody transfer actor may then recreate the hash value or code from the data and compare whether there is a match to the original hash value or code (meaning the data has not been altered since being uploaded). The same hash function needs to be used to recreate the hash value or code, so the hash function would need to be either specified and agreed upon ahead of time by all parties, or the type of hash function used is included with the uploaded data in order to successfully recreate the hash value or code.

In some embodiments, installation of cryptographic hardware is not a desired or feasible option, for example, due to cost or space constraints, or conflicts with legacy hardware or operating systems. In that case, cryptographic software 224 may be used in place of the cryptographic hardware 218. The cryptographic software 224 may operate in essentially the same manner as the cryptographic hardware 218 using public/private keys. In some embodiments, the cryptographic software 224 may be stored as computer-readable instructions on the storage device 208 (as part of the distributed ledger publisher/sender app 212), or in the controller 202 (as part of the controller programming), or other convenient implementation in the computing system 200.

In the foregoing, the term "computer-readable instructions" refers to any instructions that may be performed by the controller 202 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device 208. Volatile media may include dynamic memory, such as main memory 204. Transmission itself may take the form of electromagnetic, acoustic or light waves, such as those generated during radio frequency (RF) and infrared (IR) data communications. Common forms of computer-readable media may include, for example, magnetic medium, optical medium, memory chip, and any other medium from which a computer can read.

Figure 3:
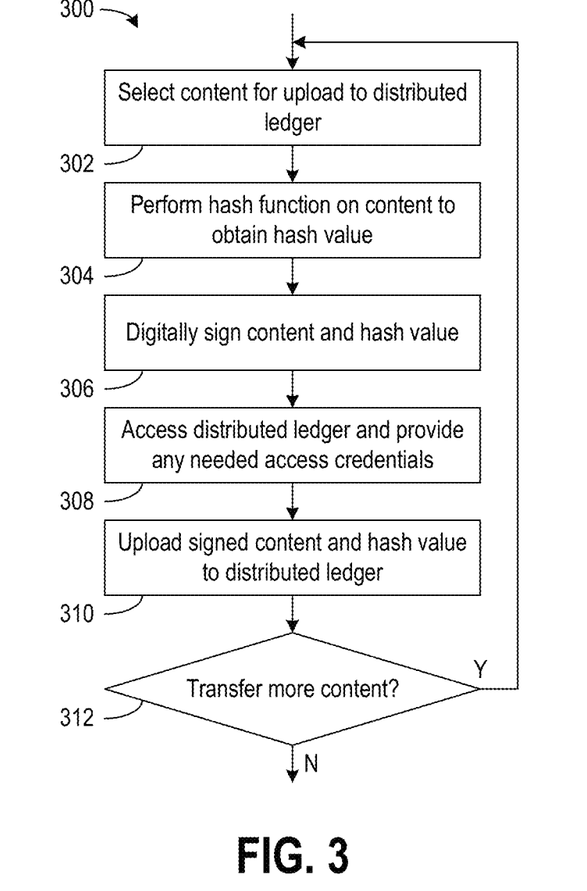
FIG. 3 is a flow diagram of an exemplary method for uploading content to a blockchain according to embodiments of the present disclosure.

FIG. 3 illustrates an exemplary method 300 that may be used with the publisher/sender app 212 of a computing system like the system 200, such as the flow monitoring and control system 124 or the field device manager 126, to upload data and other content to a ledger (e.g., the ledger 114). The method generally begins at 302 where content is selected or otherwise designated for transfer to the ledger. Where the custody transfer is an oil and gas custody transfer, the content may include the hydrocarbon flow rate, pressure, temperature, quality, viscosity, and any other parameter that may be deemed relevant in an oil and gas custody transfer. All of the content acquired by a given system 200 may be published, or a filter may be used to limit publication to only a subset of all acquired content based on certain criteria (e.g., data type, size, quality, timestamp, etc.). At 304, a hash function is applied to the content to obtain a hash value for the content. As discussed earlier, the hash value may be used later to confirm that no changes were made to the content, which would produce a different hash value.

At 306, a private key is used to encrypt (digitally sign) the content and the hash value. The private key is supposed to be uniquely (and securely) associated with the computing system 200 (e.g., flow monitoring and control system 124, field device manager 126, etc.) and not intended for use by any other device. Only the public key associated with the private key can be used to successfully decrypt whatever content was encrypted by the private key, thereby unambiguously authenticating the originator (i.e., computing system 200) of the encrypted content, assuming the private key was not stolen or shared with another.

At 308, the distributed ledger is accessed and appropriate credentials are provided (e.g., username, password, etc.). This may be accomplished in some embodiments by connecting the system 200 to one of the nodes making up the ledger using, for example, the URL of the node, or connecting the system to the platform hosting the ledger (e.g., Ethereum, Hyperledger Fabric, IOTA, etc.). At 310, the digitally signed (encrypted) content and hash value are uploaded or otherwise transferred to the ledger and processed by the nodes in the ledger.

At 312, a determination is made whether more content needs to be uploaded to the ledger. If yes, then the method returns to 302 and proceeds as described above. If no, then the method continues with operation of the computing system 200 as programmed.

Figure 4:
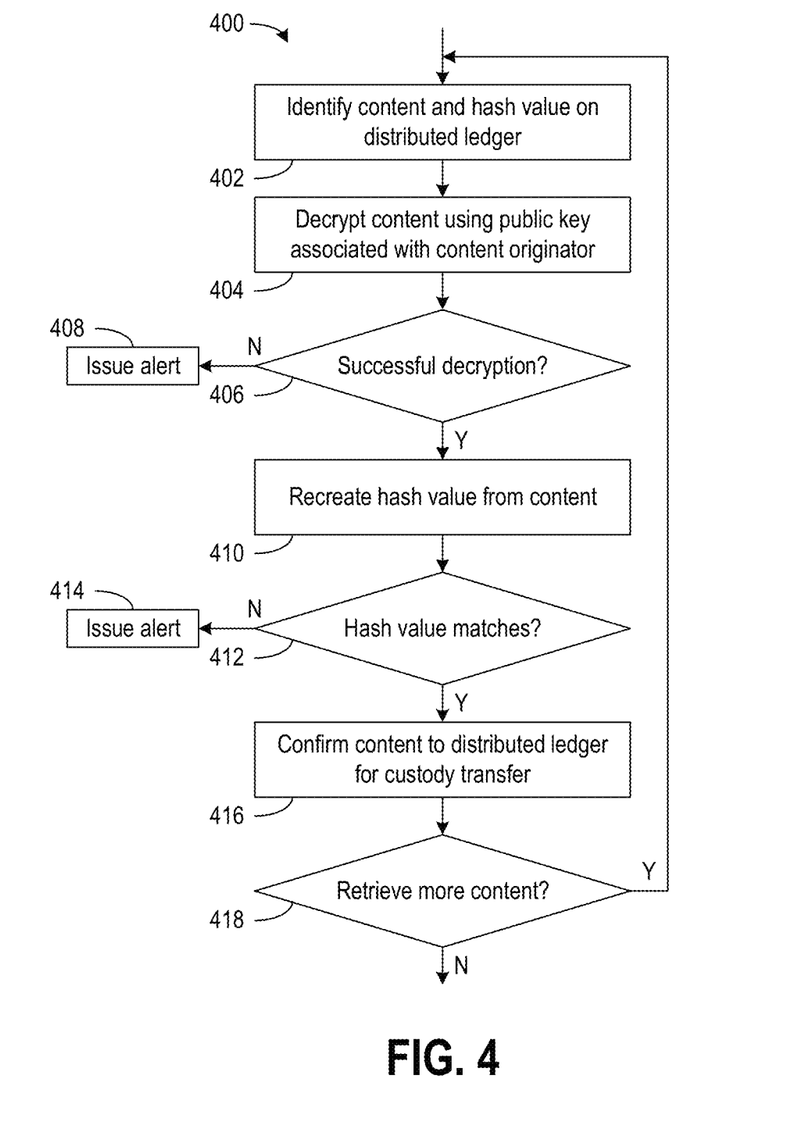
FIG. 4 is a flow diagram of an exemplary method for accessing content on a blockchain according to embodiments of the present disclosure.

FIG. 4 illustrates an exemplary method 400 that may be used by a custody transfer actor 138, such as producers, operators, regulators, and the like, to access (e.g., view, download, etc.) custody transfer data and other content on the ledger. More specifically, the method 400 may be performed by a custody transfer application, such as a dashboard, running on a computer, tablet, or smart phone of the custody transfer actor. The method generally begins at 402 where, after connecting to the ledger and providing appropriate credentials, the custody transfer actor identifies or otherwise selects the content to be accessed. This may be accomplished using a search function based on some criteria (e.g., device type, data type, size, quality, timestamp, etc.). It is of course possible for the custody transfer actor to access all the content on the ledger, then search for specific content later after the content has been decrypted and verified.

At 404, the accessed content is decrypted using the public key associated with the originator of the content, which was previously provided and attested by the cryptographic hardware attestation app (e.g., on the mobile device 156). A determination is made at 406 whether the content was successfully decrypted. If no, then an alert is issued at 408 notifying the custody transfer actor of the decryption failure and the attempt to access the content ends (or is continued offline through other channels).

If the decryption is successful, then a hash value is obtained for the decrypted content at 410 using the same hash function that was used to create the original hash value provided with the content. As mentioned earlier, the hash function can be specified ahead of time, or the type of hash function used could be included with the transferred content. A determination is made at 412 whether the recreated hash value matches the transferred hash value. If no, meaning the decrypted content does not match the transferred content, then another alert is issued at 414 notifying the custody transfer actor of the altered content and the attempt to access the content ends (or is continued offline through other channels).

If the recreated hash value matches the transferred hash value, then the content is validated to the ledger at 416 and may thereafter be used for custody transfer purposes. For example, any smart contracts on the ledger that involve the content may be automatically executed at this time according to the terms of the smart contracts.

At 418, a determination is made whether more content needs to be accessed from the ledger. If yes, then the method returns to 402 and proceeds as described above. If no, then the method continues with any further operation that may have been programmed.

Figure 5:
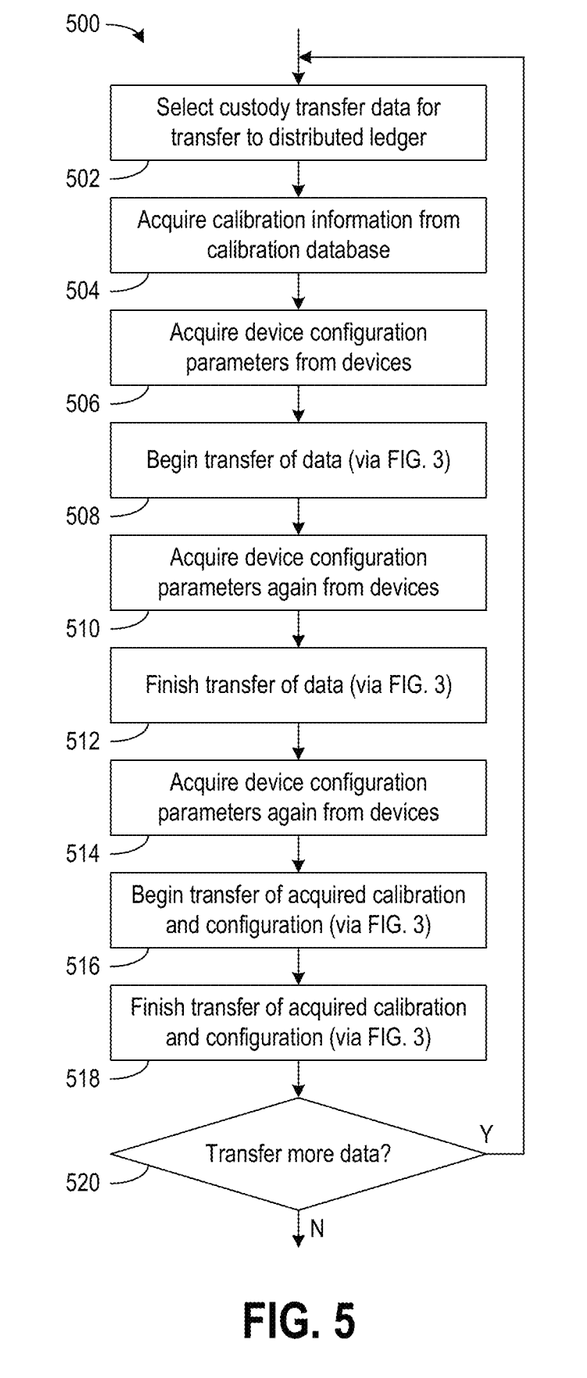
FIG. 5 is a flow diagram of an exemplary method for uploading custody transfer data on a blockchain according to embodiments of the present disclosure.

An example of the method 300 of FIG. 3 being used to transfer custody transfer data to a ledger is depicted in FIG. 5, via an exemplary flowchart for a method 500. In FIG. 5, custody transfer data and data reflecting calibration results are published to a ledger, as disclosed herein. The calibration data, which may be stored in a calibration database, is generated from periodic calibration tests performed (e.g., in a laboratory) on flow meters and other instruments used to acquire the custody transfer data. This stored calibration data can then be used as evidence of regulatory compliance and for proving equipment, results, error rates, and the like. For example, the stored calibration data can be compared to on-site calibration results and any deviations can be notified to appropriate personnel.

The method 500 generally begins at 502 where custody transfer data is selected for transfer to a distributed ledger, as disclosed herein. At 504, calibration data and other calibration information is acquired from a calibration database. At 506, device configuration parameters are acquired or read from actual devices on-site, such as the flow meters and other instruments used to acquire the custody transfer data. At 508, transfer of the custody transfer data to the ledger begins. While the transfer to the ledger is in progress, another reading of the device configuration parameters is taken from the actual devices on-site at 510. At 512, the data transfer to the ledger is concluded. At 514, yet another reading of the device configuration parameters is taken from the actual devices on-site. At 516, transfer of the acquired calibration and configuration parameters to the ledger begins, and at 518, the transfer is concluded. At 520, a determination is made whether more data is to be transferred to the ledger. If yes, then the method returns to 502 and proceeds as described above. If no, then the method continues with operations as programmed.

Figure 6:
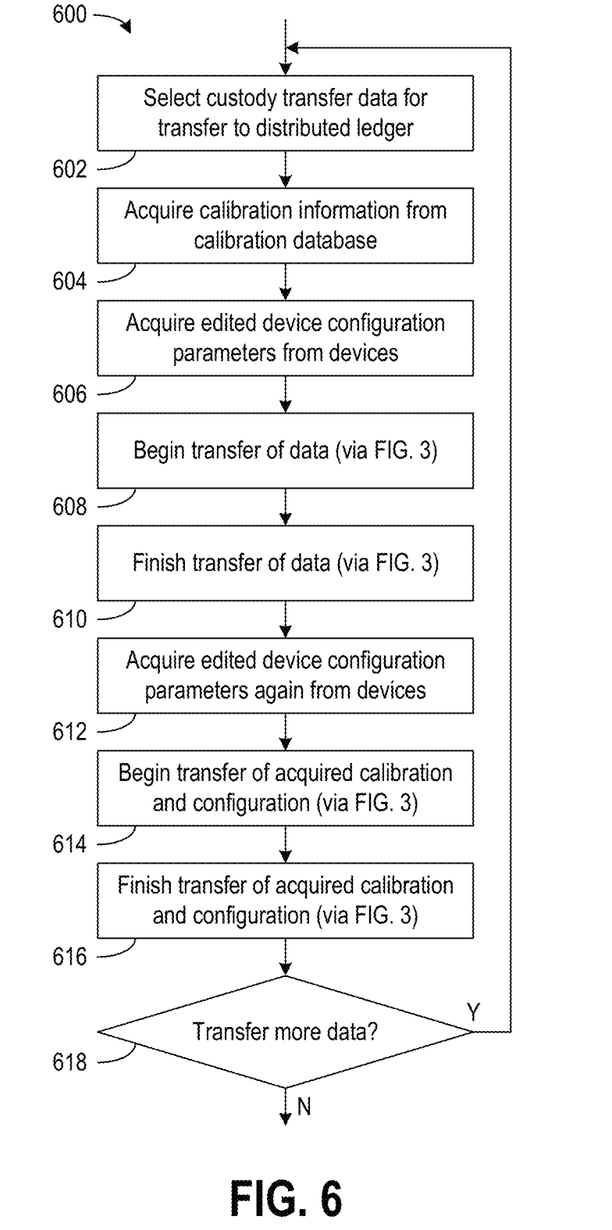
FIG. 6 is a flow diagram of an alternative method for uploading custody transfer data on a blockchain according to embodiments of the present disclosure.

An alternative example of the method 300 of FIG. 3 being used to transfer custody transfer data to a ledger is depicted in FIG. 6, via an exemplary flowchart for a method 600. This method 600 is similar to the method 500 except that the device configuration parameters here have been modified or edited. The method 600 captures the modified or edited configuration parameters to ensure that the most recent configuration parameters are transferred to the ledger.

The method 600 again generally begins at 602 with selection of custody transfer data for transfer to a distributed ledger, as disclosed herein. At 604, calibration data and other calibration information is acquired from a calibration database. At 606, however, modified or edited device configuration parameters are acquired from the actual devices on-site. At 608, transfer of the custody transfer data to the ledger begins, and at 610, the data transfer to the ledger is concluded. At 612, another reading of the edited device configuration parameters is taken from the actual devices on-site. At 614, transfer of the acquired calibration and configuration parameters to the ledger begins, and at 618, the transfer is concluded. At 620, a determination is made whether more data is to be transferred to the ledger. If yes, then the method returns to 602 and proceeds as described above. If no, then the method continues with operations as programmed.

In the preceding discussion, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a private area network (PAN), local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A system for tamper-proof publishing of hydrocarbon data in oil and gas custody transfers, comprising:
    a controller; and
    a storage device coupled to the controller and storing computer-readable instructions for a distributed ledger app thereon, wherein the distributed ledger app, when executed by the controller, causes the system to:
    initiate an exchange of hydrocarbon data in an oil and gas custody transfer at a Lease Automatic Custody Transfer (LACT) unit;
    acquire the hydrocarbon data from the LACT, the LACT configured to measure a volume and quality of hydrocarbons for the custody transfer;
    obtain a hash value for the hydrocarbon data, the hash value produced using a predefined hash function;
    apply a digital signature to the hydrocarbon data and the hash value;
    connect to a distributed ledger designated to receive the hydrocarbon data; and
    transmit the hydrocarbon data and the hash value to the distributed ledger over a private or public network, including the Internet;
    wherein the distributed ledger app further causes the system to obtain a hash value of equipment calibration data and device configuration parameters for equipment and devices used to acquire the hydrocarbon data, apply a digital signature to the equipment calibration data, the device configuration parameters, and the hash value, and transmit the equipment calibration data, device configuration parameters, and hash value to the distributed ledger; and
    wherein the distributed ledger app further causes the system to upload to the distributed ledger a public key of a public/private key pair for the devices used to acquire the hydrocarbon data, the public key being stored in a public key repository in the distributed ledger.

2. The system of claim 1, wherein the digital signature is applied by encrypting the hydrocarbon data and the hash value using a private key of the public/private key pair uniquely associated with the system.

3. The system of claim 2, further comprising cryptographic hardware coupled to the controller, the cryptographic hardware operable to generate the hash value for the hydrocarbon data.

4. The system of claim 1, wherein the distributed ledger is a private ledger configured to require provision of access credentials and the distributed ledger app causes the system to provide the access credentials.

5. The system of claim 1, wherein the distributed ledger stores one or more smart contracts thereon and the hydrocarbon data transmitted by the system causes at least one of the smart contracts to self-execute.

6. The system of claim 1, wherein the device configuration parameters obtained by the system includes edited device configuration parameters acquired from on-site devices used to acquire the hydrocarbon data.

7. A method of tamper-proof publishing of hydrocarbon data in oil and gas custody transfers, comprising:
    initiating, at a Lease Automatic Custody Transfer (LACT) unit, an exchange of hydrocarbon data in an oil and gas custody transfer;
    acquiring the hydrocarbon data from the LACT, the LACT configured to measure a volume and quality of hydrocarbons for the custody transfer;
    obtaining, using a controller, a hash value for the hydrocarbon data, the hash value produced using a predefined hash function;
    applying, using the controller, a digital signature to the hydrocarbon data and the hash value;
    connecting, using the controller, to a distributed ledger designated to receive the hydrocarbon data; and
    transmitting, using the controller, the hydrocarbon data and the hash value to the distributed ledger over a private or public network, including the Internet;
    wherein the method further comprises obtaining a hash value for equipment calibration data and device configuration parameters for equipment and devices used to acquire the hydrocarbon data, applying a digital signature to the equipment calibration data, the device configuration parameters, and the hash value, and transmitting the equipment calibration data, device configuration parameters, and hash value to the distributed ledger; and
    wherein the method further comprises uploading to the distributed ledger a public key of a public/private key pair for the devices used to acquire the hydrocarbon data, the public key being stored in a public key repository in the distributed ledger.

8. The method of claim 7, wherein applying the digital signature comprises encrypting the hydrocarbon data and the hash value using a private key of the public/private key pair uniquely associated with the controller.

9. The method of claim 8, wherein obtaining the hash value for the hydrocarbon data comprises using cryptographic hardware coupled to the controller to generate the hash value.

10. The method of claim 7, wherein the distributed ledger is a private ledger configured to require provision of access credentials and accessing the ledger comprises using the controller to provide the access credentials.

11. The method of claim 7, wherein the distributed ledger stores one or more smart contracts thereon and the hydrocarbon data transmitted by the controller causes at least one of the smart contracts to self-execute.

12. The method of claim 7, wherein the device configuration parameters obtained includes edited device configuration parameters acquired from on-site devices used to acquire the hydrocarbon data.

13. A non-transitory computer-readable medium containing computer-readable instructions that, when executed by operation of a controller, cause the controller to:
    initiate an exchange of hydrocarbon data in an oil and gas custody transfer at a Lease Automatic Custody Transfer (LACT) unit;
    acquire the hydrocarbon data from the LACT, the LACT configured to measure a volume and quality of hydrocarbons for the custody transfer;

obtain a hash value for the hydrocarbon data, the hash value produced using a predefined hash function;

apply a digital signature to the hydrocarbon data and the hash value;

connect to a distributed ledger designated to receive the hydrocarbon data;

transmit the hydrocarbon data and the hash value to the distributed ledger over a private or public network, including the Internet;

wherein the computer-readable instructions further cause the controller to obtain a hash value for equipment calibration data and device configuration parameters for equipment and devices used to acquire the hydrocarbon data, apply a digital signature to the equipment calibration data, the device configuration parameters, and the hash value, and transmit the equipment calibration data, device configuration parameters, and hash value to the distributed ledger; and wherein the computer-readable instructions further cause the controller to upload to the distributed ledger a public key of a public/private key pair for the devices used to acquire the hydrocarbon data, the public key being stored in a public key repository in the distributed ledger.

14. The computer-readable medium of claim 13, wherein the computer-readable instructions cause the controller to apply the digital signature by encrypting the hydrocarbon data and the hash value using a private key of a public/private key pair uniquely associated with the controller.

15. The computer-readable medium of claim 14, wherein the computer-readable instructions further cause the controller to use cryptographic hardware coupled to the controller to generate the hash value for the hydrocarbon data.

16. The computer-readable medium of claim 13, wherein the distributed ledger is a private ledger configured to require provision of access credentials and the computer-readable instructions cause the controller to provide the access credentials.

17. The computer-readable medium of claim 13, wherein the distributed ledger stores one or more smart contracts thereon and the hydrocarbon data transmitted by the controller causes at least one of the smart contracts to self-execute.

18. The computer-readable medium of claim 13, wherein the device configuration parameters obtained includes edited device configuration parameters acquired from on-site devices used to acquire the hydrocarbon data.

* * * * *